(12) United States Patent  
Pop

(10) Patent No.: US 9,404,325 B2  
(45) Date of Patent: Aug. 2, 2016

(54) DRILL BIT DRIVER

(71) Applicant: Peter L Pop, Calgary (CA)

(72) Inventor: Peter L Pop, Calgary (CA)

( * ) Notice: Subject to any disclaimer, the term of this patent is extended or adjusted under 35 U.S.C. 154(b) by 76 days.

(21) Appl. No.: 14/535,533

(22) Filed: Nov. 7, 2014

(65) Prior Publication Data

US 2015/0159446 A1    Jun. 11, 2015

Related U.S. Application Data

(60) Provisional application No. 61/914,642, filed on Dec. 11, 2013.

(51) Int. Cl.
*B23Q 3/10* (2006.01)
*E21B 19/18* (2006.01)
*E21B 12/00* (2006.01)

(52) U.S. Cl.
CPC ............. *E21B 19/18* (2013.01); *B23Q 3/108* (2013.01); *E21B 12/00* (2013.01)

(58) Field of Classification Search
CPC ............. A63B 2022/18; A63B 2022/185; A63B 21/022; A63B 21/023; A63B 21/025; A63B 21/028; A63B 22/18; A63G 31/14
USPC ............. 108/10; 248/157, 416; 482/146; 269/310
See application file for complete search history.

(56) References Cited

U.S. PATENT DOCUMENTS

| | | | | |
|---|---|---|---|---|
| 650,310 A | * | 5/1900 | Dunning | A62B 1/22 182/137 |
| 2,106,994 A | * | 2/1938 | Chapman | A63B 21/05 482/126 |
| 2,494,094 A | * | 1/1950 | Horstman | A63B 23/0211 482/128 |
| 2,593,538 A | * | 4/1952 | Cleveland | B23Q 3/108 248/412 |
| 3,022,036 A | * | 2/1962 | Bassett | A63G 31/14 248/600 |
| 3,228,392 A | * | 1/1966 | Speyer | A61H 23/0218 482/122 |
| 3,276,764 A | * | 10/1966 | Bitterberg | B61D 3/14 105/200 |
| 3,475,019 A | * | 10/1969 | Mutter | A63G 31/14 472/135 |
| 4,211,404 A | * | 7/1980 | Blowsky | A63B 21/05 482/128 |
| 4,739,986 A | * | 4/1988 | Kucharik | A63B 23/08 482/146 |
| 6,022,009 A | * | 2/2000 | Hill | B23Q 1/032 269/289 R |
| 6,598,365 B2 | * | 7/2003 | Abraham | E04F 15/225 267/160 |
| 2003/0139268 A1 | * | 7/2003 | Chen | A63B 22/18 482/146 |
| 2004/0139831 A1 | * | 7/2004 | Nagy | B25G 1/085 81/490 |
| 2009/0227426 A1 | * | 9/2009 | Dubar | A63B 21/0004 482/34 |
| 2012/0214650 A1 | * | 8/2012 | Jahns | A63B 21/0004 482/111 |
| 2014/0135189 A1 | * | 5/2014 | Thomason | A63B 23/1236 482/141 |

* cited by examiner

*Primary Examiner* — Joseph J Hail  
*Assistant Examiner* — Tyrone V Hall, Jr.

(57) ABSTRACT

The present invention is a drill bit driver including a lower spring support connected at a lower end to a base and including an outer surface, as well as an upper spring support slideably and telescopically mounted over the outer surface e of the lower spring support. The drill bit driver allows for resiliently biasing the upper spring support relative to the lower spring support. The present invention further includes a table rotably connected to the upper end of the upper spring support, so that the table rotates about a longitudinal axis, for receiving a drill bit. This drill bit driver also allows for tilting the table relative to the horizontal.

11 Claims, 2 Drawing Sheets

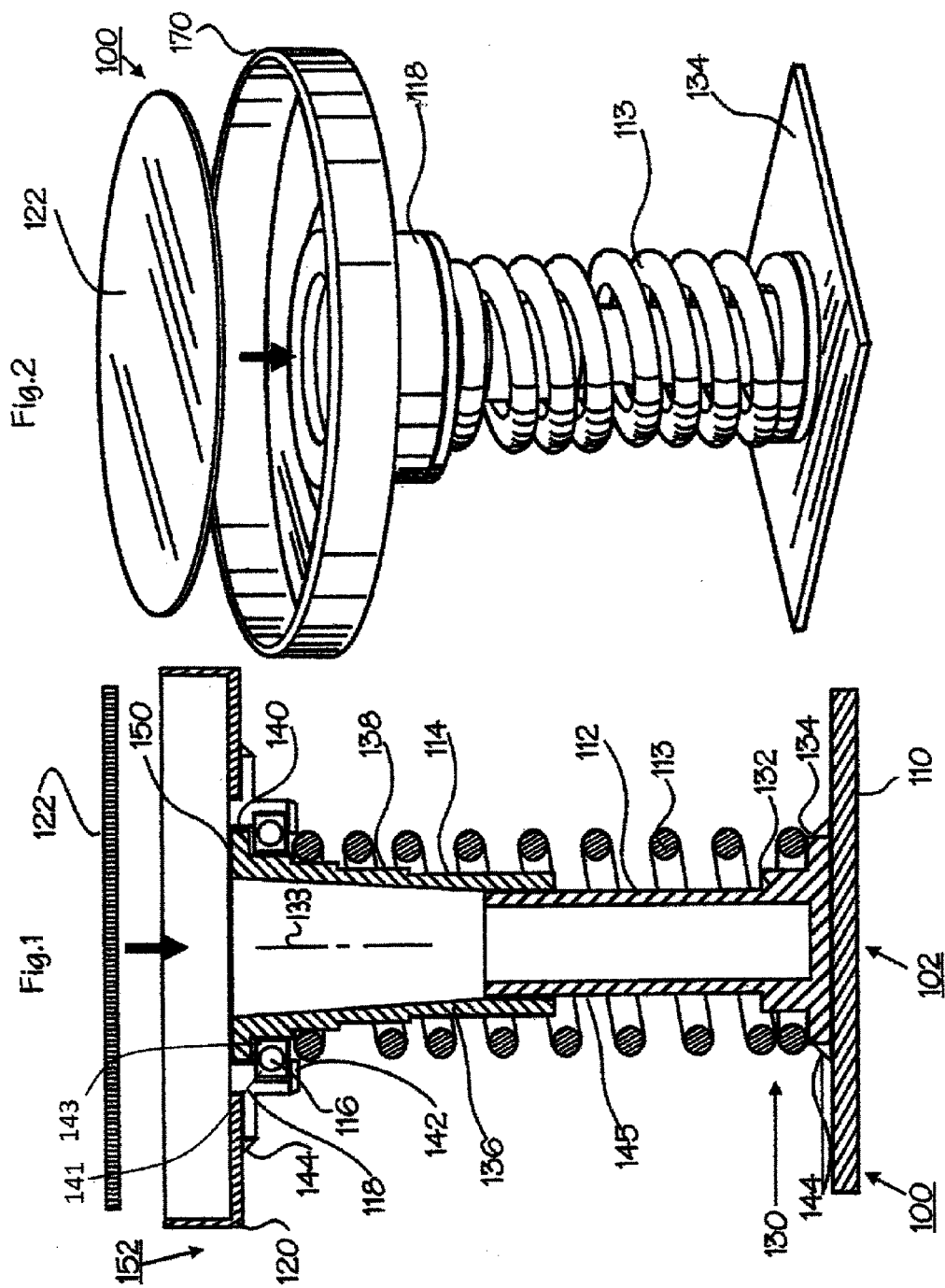

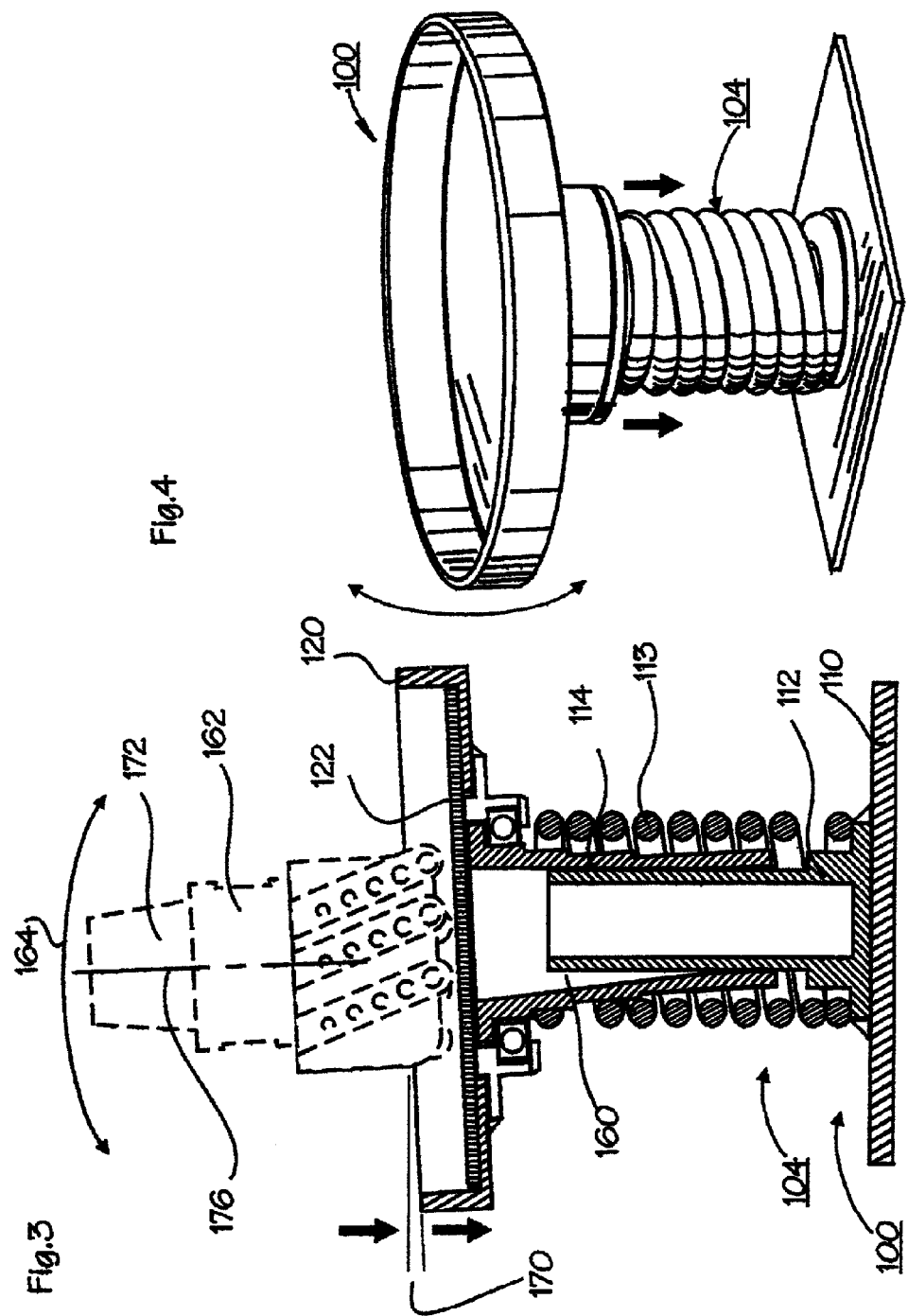

DRILL BIT DRIVER

This application claims priority from previously filed Provisional Application 61/914,642, titled DRILL BIT DRIVER, filed on Dec. 11, 2013, having a first named inventor Peter Pop.

FIELD OF THE INVENTION

The present concept relates to devices for mounting drill bits onto drilling apparatus and more specifically a device for mounting a drill bit onto a directional drilling apparatus.

BACKGROUND OF THE INVENTION

Major advances in directional drilling occurred in the 1970's when downhole drilling motors also known as mud motors driven by the hydraulic power of drilling mud circulated down the drill string became common. This concept allowed the drill bit to continue to rotate at the cutting face at the bottom of the hole while most of the drill pipe was held stationary. A piece of bent pipe also known as the bent stub between the stationary drill pipe and the top of the motor allowed the direction of the wellbore to change without needing to pull all of the drill pipe out and place another whipstock. Coupled with the development of measurement while drilling, tools using for example mud pulse telemetry, or networked or wired pipe or EM telemetry allows tools down hole to send directional data back to the surface without disturbing drilling operations, directional drilling became easier.

More recently several companies have developed tools which allow directional control while rotating. These tools are referred to as rotary steerable systems (RSS). Rotary steerable systems technology has made access and directional control possible in previously inaccessible or uncontrollable formations.

When changing the drill bit on motorized directional drilling assembly alignment of the drill bit with the motor section of the directional drilling apparatus becomes necessary in order to be able to properly thread the drill bit onto the end.

Due to the increasing size and the weight of drill bits and the drilling apparatus it is sometimes very difficult to obtain proper alignment between drill bits and the drilling apparatus particularly since the bearing section of the drilling apparatus is movable relative to the motor section.

Currently the drill bit is manually placed in position onto the threaded section of the drill to which it is to be attached. It is then up to personnel to lift, move, tilt, and turn the drill bit into the proper orientation in order to ensure that threading is carried out without created any cross threading complications.

Therefore there is a need for a device to be able to aid the operators to install a drill bit and to be able to obtain proper alignment between the drill bit and the drilling apparatus when threading the drill bit onto the end.

SUMMARY

The present concept is a drill bit driver which includes:
a. A lower spring support connected at a lower end to a base; and including an outer surface;
b. An upper spring support slideably and telescopically mounted over the outer surface of the lower spring support.
c. A means for resiliently biasing the upper spring support relative to the lower spring support.
d. A table rotatably connected to the upper end of the upper spring support, such that the table rotates about a longitudinal axis, the table for receiving a drill bit thereon;
e. A means for tilting the table relative to the horizontal Preferably wherein the drill bit driver is moveable between a retracted position with a drill bit resting on the table and an extended position when the drill bit is removed.

Preferably wherein the tilting means includes a tapered inner surface on the upper spring support such that the upper spring support can tilt relative to the longitudinal axis thereby creating a table tilt angle beta.

Preferably wherein the tilting means includes a tapered outer surface on the lower spring support such that the outer spring support can tilt relative to the longitudinal axis thereby creating a table tilt angle beta.

Preferably further including a bearing with an inner race connected to the upper spring support and the outer race operably connected to the table such that the table can rotate about the longitudinal axis.

Preferably wherein the upper spring support includes a flange proximate to the upper end for abutting against the bearing and preventing upward longitudinal movement of the bearing.

Preferably further including a table and bearing support for connecting the outer race to the table.

Preferably further including a bearing retainer connected to the table and bearing support and abutting against the outer race preventing the bearing from moving longitudinally downwardly.

Preferably wherein the biasing means includes a coil spring.

Preferably wherein the lower spring support including a spring stop proximate the lower end for abutting against the lower end of the coil spring.

Preferably wherein the lower spring support including a shoulder proximate the lower end for receiving the spring lower end thereover.

Preferably wherein the upper spring support including a stepped outer surface of decreasing diameters with the largest diameter proximate the upper end.

BRIEF DESCRIPTION OF THE DRAWINGS

FIG. 1 is a cross sectional schematic side elevational view of the drill bit driver in the extended position with all of the components assembled except for the table top.

FIG. 2 is a schematic side view of the drill bit driver showing the insertion of the table top.

FIG. 3 is a schematic side elevational view of the drill bit driver in a retracted position together with a drill bit deployed onto the table top showing some tilt angle.

FIG. 4 is a schematic perspective side view of the drill bit driver shown in a retracted position with some tilt angle.

DETAILED DESCRIPTION OF THE PREFERRED EMBODIMENT

Referring to the Figures the present concept a drill bit driver shown generally as 100 includes the following major components namely a base 110 having mounted thereon a lower spring support 112 receiving a spring 113 there over and also an upper spring support 114 which is received telescopically over lower spring support 112.

Upper spring support 114 also is mounted to an inner race 143 of bearing 116 and to outer race 141 of bearing 116 is connected to a table and bearing support 118 which supports table 120 and table top 122. Upper spring support 114 is mounted along longitudinal axis 133.

Drill bit driver 100 as shown in a extended position 102 namely wherein spring 113 is almost entirely suspended thereby separating upper spring support 114 from lower spring support 112.

Lower spring support 112 at a lower end 130 includes a shoulder 132 for spring 113 to fit over and also a spring stop 134 for the lower end 130 of spring 113 to abut against.

Upper spring support 114 includes an inner tapered surface 136 which preferably is somewhere between 1° and 10° relative to the vertical and most preferably is around 3°.

The reader will note that the inner tapered surface 136 of upper spring support 114 is received slideably and telescopically over the outer surface 145 of lower spring support 112.

Upper spring support 114 also includes a stepped outer surface 138 and terminates at upper end 152 with a flange 140 which together with the stepped outer surface 138 define a bearing recess 150 for receiving bearing 116 therein.

There further is a bearing retainer 142 connected to table and bearing support 118 for retaining bearing 116 into bearing recess 150. The upper end 152 of upper spring support 114 is able to vertically tilt slightly relative to lower spring support 112 due to the inner tapered surface 136 of upper spring support 114.

In Use

Referring now to FIGS. 3 and 4, in FIG. 3 in particular there is a drill bit 162 deployed upon table top 122 of drill bit driver 100. The reader will note that there is a tilt angle alpha which is the gap shown between the upper spring support 114 and the lower spring support 112 namely angle Alpha shown as 160.

The slight taper of the inner tapered surface 136 of upper spring support 114 allows for a small amount of tilt angle Alpha shown as 160 which translates into a table tilt angle Beta shown as 170.

Therefore when the drill bit 162 is placed upon table 120 first there is some cushion effect due to compression of spring 113 due to the weight of drill bit 162 placing drill bit driver 100 into a retracted position 104 as schematically depicted in FIG. 3. The heavier the drill bit 162 the more compression of spring 113 will occur.

The male threaded portion 172 of drill bit 162 must be aligned with the female threaded portion of the drill apparatus which may not always be perfectly aligned with the vertical.

Therefore the operator can tilt the table 120 up to a maximum of table tilt angle Beta shown as 170 to bring into alignment the longitudinal axis 176 of the drill bit with the longitudinal axis of the drilling apparatus thereby ensuring no cross threading will occur.

Additionally the threading can be simply accomplished by turning table 120 in the necessary direction in order to engage the threads of the threaded portion 172 of drill bit 162 into the drilling apparatus which is not shown.

In this manner attaching the drill bit 152 to the drilling apparatus now becomes a one operator function rather than having to enlist a number of people to lift and rotate drill bit 162 onto the drilling apparatus.

Drill bit driver 100 becomes particularly useful the heavier the drill bit 152 becomes since the weight of the drill bit 162 is being supported by drill bit driver 100 and rather than having to deal with lifting the drill bit, bringing into alignment the threaded portion 172 and simultaneously rotating the drill bit 162, the operator simply needs to get the drill bit 162 onto the table 120 and thereafter by tilting the table the operator is able to align the longitudinal axis 176 and by rotating the table 120 the operator is able to threadably insert the drill bit into the drilling apparatus.

It should be apparent to persons skilled in the arts that various modifications and adaptation of this structure described above are possible without departure from the spirit of the invention the scope of which defined in the appended claim.

I claim:

1. A drill bit driver comprising:
    a) a lower spring support connected at a lower end to a base; and including an outer surface;
    b) an upper spring support slideably and telescopically mounted over the outer surface of the lower spring support,
    c) a means for resiliently biasing the upper spring support relative to the lower spring support,
    d) a table rotatably connected to the upper end of the upper spring support, such that the table rotates about a longitudinal axis, the table for receiving a drill bit thereon; and
    e) a means for tilting the table relative to the horizontal, wherein the tilting means includes a tapered inner surface on the upper spring support such that the upper spring support can tilt relative to the longitudinal axis thereby creating a table tilt angle beta.

2. The drill bit driver claimed in claim 1 wherein the drill bit driver moveable between a retracted position with a drill bit resting on the table and an extended position when the drill bit is removed.

3. The drill bit driver claimed in claim 1 wherein the tilting means includes a tapered outer surface on the lower spring support such that the outer spring support can tilt relative to the longitudinal axis thereby creating a table tilt angle beta.

4. The drill bit driver claimed in claim 1 wherein the biasing means includes a coil spring.

5. The drill bit driver claimed in claim 4 wherein the lower spring support including a spring stop proximate the lower end for abutting against the lower end of the coil spring.

6. The drill bit driver claimed in claim 5 wherein the lower spring support including a shoulder proximate the lower end for receiving the spring lower end thereover.

7. A drill bit driver comprising:
    a) a lower spring support connected at a lower end to a base; and including an outer surface;
    b) an upper spring support slideably and telescopically mounted over the outer surface of the lower spring support,
    c) a means for resiliently biasing the upper spring support relative to the lower spring support,
    d) a table rotatably connected to the upper end of the upper spring support, such that the table rotates about a longitudinal axis, the table for receiving a drill bit thereon; and
    e) a means for tilting the table relative to the horizontal; and
    f) further including a bearing with an inner race connected to the upper spring support and the outer race operably connected to the table such that the table can rotate about the longitudinal axis.

8. The drill bit driver claimed in 7 wherein the upper spring support includes a flange proximate the upper end for abutting against the bearing and preventing upward longitudinal movement of the bearing.

9. The drill bit driver claimed in claim 7 further including a table and bearing support for connecting the outer race to the table.

10. The drill bit driver claimed in claim 9 further including a bearing retainer connected to the table and bearing support and abutting against the outer race preventing the bearing from moving longitudinally downwardly.

11. A drill bit driver comprising:
   a) a lower spring support connected at a lower end to a base; and including an outer surface;
   b) an upper spring support slideably and telescopically mounted over the outer surface of the lower spring support,
   c) a means for resiliently biasing the upper spring support relative to the lower spring support,
   d) a table rotatably connected to the upper end of the upper spring support, such that the table rotates about a longitudinal axis, the table for receiving a drill bit thereon; and
   e) a means for tilting the table relative to the horizontal; and
   f) wherein the upper spring support including a stepped outer surface of decreasing diameters with the largest diameter proximate the upper end.

* * * * *